(No Model.)
A. THALHEIMER.
PLANT PROTECTOR.
No. 273,911.  Patented Mar. 13, 1883.
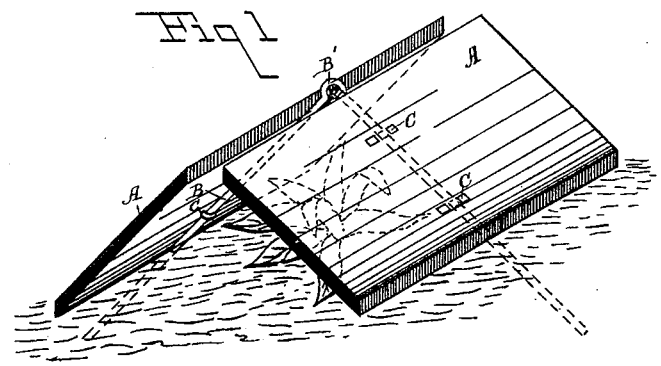
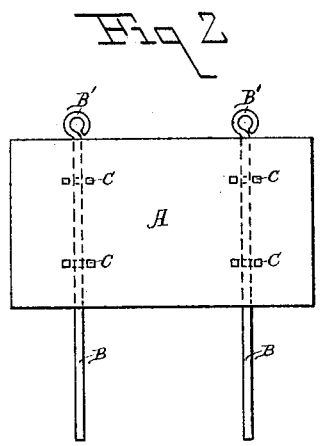
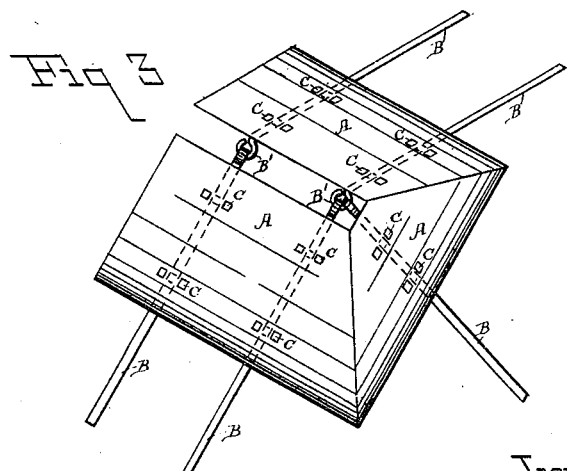
Witnesses
Samuel P. Kinsey.
Frank P. Kinsey.
Inventor
Albert Thalheimer
pr Thomas P. Kinsey Atty

UNITED STATES PATENT OFFICE.

ALBERT THALHEIMER, OF READING, PENNSYLVANIA.

PLANT-PROTECTOR.

SPECIFICATION forming part of Letters Patent No. 273,911, dated March 13, 1883.

Application filed September 16, 1882. (No model.)

*To all whom it may concern:*

Be it known that I, ALBERT THALHEIMER, a citizen of the United States, residing at the city of Reading, county of Berks, State of Pennsylvania, have invented a new and useful Improvement in Plant-Protectors, of which the following is a specification.

This improvement relates more particularly to protectors for tobacco and cabbage plants when first set out, but may be adapted by florists and truckmen for all propagative purposes.

The object of the invention is to furnish the agriculturalist, truckman, and florist with a ready, convenient, and inexpensive means of protecting their young plants when first set out, which, when the duty has been performed, may be stored away in a small compass for future use, and the use of which will add to and not detract from the appearance of the land under cultivation, as is now done by the indiscriminate use of paper scraps, cabbage-leaves, &c., liable to be blown away just at the time the service of a protector is most needed.

Referring to the drawings herewith, forming a part of this specification, and in which similar parts are similarly lettered, Figure 1 represents in perspective an elevation of my improvement placed over a plant for its protection. Fig. 2 is a side elevation of the same. Fig. 3 represents a three-sided arrangement of the protector.

A represents the sides; B, the anchor-pins; C, the staples securing the same to the sides. I do not limit myself to any special form or size, as, the principle of protection involved in my invention being adopted, the size of the sides and anchors will be made to conform to the size of the plant to be protected. I find that for tobacco-plants sides five inches by nine inches are ample.

The farmer, truckman, or florist, knowing the direction of the sun's rays upon his fields, will govern himself accordingly when placing the protectors over the plants, so arranging them as to exclude the sun's rays, yet permitting a free circulation of air around the plant. It will be found, particularly in tobacco cultivation, that plants thus protected will make much better growth in a given time than under the system of paper covers lying close to the ground. After the plants have acquired a root-hold one side of the protector may be withdrawn from the ground and laid back upon the remaining side, and in a few days after the whole may be removed, this partial removal giving additional strength to the plants and preventing backset.

The sides may be of any waste lumber cut to uniform size. I prefer to make them out of material from one-quarter inch to one-half inch thick. I do not limit myself to the use of wood. Any suitable material may be used.

The anchors of wire are preferably made of galvanized iron, having an eye turned at the upper end, which eyes interlock, and their lower ends project four or more inches below the lower edge of the sides. I find one anchor central to a side of five inches by nine inches is ample; but, if desired, there may be two or more anchors to each side. The anchors are secured to the sides most readily by small staples or double tacks procurable at the hardware stores, or by the use of machinery a hole may be drilled through the width of the side piece, and the anchor shoved through the same. By making them of a uniform size for special purposes they may be stored away, (when not needed in the field,) the eye-connection between the anchors at the top admitting of the lying of the sides together, and they will therefore occupy but little room.

For delicate plants the three-sided protectors will afford the most success; but for general culture the two-sided or tent-shaped protector will be more satisfactory.

Having described my improvement, its advantages, and mode of construction, I desire to obtain Letters Patent for the following claim thereon:

In a plant-protector as described, the combination of side pieces, A, and anchors B, linked at B', and secured by staples C or their equivalent, whereby the protectors are adapted to be laid flat upon each other for storage or shipment, substantially as and for the purpose specified.

ALBERT THALHEIMER.

Witnesses:
WILLIAM L. GRANT,
EDWARD DAVIS.